(12) United States Patent
Beeching (10) Patent No.: US 11,835,160 B2
(45) Date of Patent: Dec. 5, 2023

(54) PIPE FLANGE COUPLING DEVICE, A PIPE ASSEMBLY AND A TOP-SUBMERGED-LANCE (TSL) SYSTEM

(71) Applicant: METSO OUTOTEC FINLAND OY, Tampere (FI)

(72) Inventor: James Beeching, Victoria (AU)

(73) Assignee: METSO OUTOTEC FINLAND OY, Tampere (FI)

( * ) Notice: Subject to any disclaimer, the term of this patent is extended or adjusted under 35 U.S.C. 154(b) by 0 days.

(21) Appl. No.: 17/861,293

(22) Filed: Jul. 11, 2022

(65) Prior Publication Data

US 2022/0364661 A1 Nov. 17, 2022

Related U.S. Application Data

(63) Continuation of application No. PCT/FI2020/050140, filed on Mar. 4, 2020.

(51) Int. Cl.
*F16L 23/036* (2006.01)
*F16L 37/124* (2006.01)

(52) U.S. Cl.
CPC ........... *F16L 23/036* (2013.01); *F16L 37/124* (2013.01)

(58) Field of Classification Search
CPC ....... F16L 23/036; F16L 23/003; F16L 23/02; F16L 23/006; F16L 23/04;
(Continued)

(56) References Cited

U.S. PATENT DOCUMENTS 2,393,795 A * 1/1946 Miller ................... F16L 23/003
29/238
3,830,533 A * 8/1974 Mezei ................... F16L 23/036
285/364

(Continued)

FOREIGN PATENT DOCUMENTS

CN 20310410 U 9/2013
CN 204281291 U 4/2015
(Continued)

OTHER PUBLICATIONS

International Search Report issued by the Finnish Patent and Registration Office acting as the International Searching Authority in relation to International Application No. PCT/FI2020/050140 dated Dec. 2, 2020 (4 pages).

(Continued)

*Primary Examiner* — Matthew Troutman
*Assistant Examiner* — Fannie C Kee
(74) *Attorney, Agent, or Firm* — Robert P. Michal, Esq.; Carter, DeLuca & Farrell LLP (57) ABSTRACT

A pipe flange coupling device, which is attachable in connection with a first pipe of a first pipe flange, having pawls engaging a second pipe flange of a second pipe. The pawls are fixed to a spindle retractable by a translation arrangement so as to pull the second pipe flange against the first pipe flange. More particularly, the translation arrangement is configured such that, when the flanged pipes are coupled and the pawls are retracted, a force exerted on the pawls towards the extended position is transmitted via the translation arrangement against a mechanical stopper. Moreover, the translation arrangement is biased such that the translation arrangement must work against this bias in order to extend the pawls and release the flanged pipes coupled to each other.

19 Claims, 5 Drawing Sheets

(58) Field of Classification Search
CPC ............. B25B 5/061–062; B25B 27/16; Y10T 29/5367; Y10T 29/53678; Y10T 29/53913; Y10T 29/53917
USPC .............................................. 269/24, 27, 32
See application file for complete search history.

(56) References Cited

U.S. PATENT DOCUMENTS

| | | | | |
|---|---|---|---|---|
| 3,900,732 | A | * | 8/1975 | Costales ............... F16L 23/036 33/645 |
| 4,150,477 | A | * | 4/1979 | Orr ......................... B25B 27/16 29/525.08 |
| 4,183,189 | A | * | 1/1980 | Keller ................... F16L 23/036 285/912 |
| 4,198,076 | A | | 4/1980 | Mezei |
| 5,437,440 | A | * | 8/1995 | Keaton ................... B25B 5/062 269/24 |
| 6,059,277 | A | | 5/2000 | Sawdon et al. |

FOREIGN PATENT DOCUMENTS

| | | | | |
|---|---|---|---|---|
| EP | 0435079 | A2 | 7/1991 | |
| EP | 0435079 | A3 | 3/1992 | |
| EP | 1704340 | B1 | 9/2010 | |
| EP | 2527082 | A1 | 11/2012 | |
| FR | 2364351 | A1 * | 4/1978 | ............ F16L 23/036 |
| JP | H0650477 | A | 2/1994 | |
| KR | 101461553 | B1 * | 11/2014 | ............ F16L 23/036 |
| WO | WO-02086372 | A1 * | 10/2002 | ............ F16L 23/003 |
| WO | WO-2010123433 | A1 * | 10/2010 | ............ F16L 23/036 |
| WO | WO-2015170407 | A1 * | 11/2015 | ............ F16L 23/036 |

OTHER PUBLICATIONS

Written Opinion of the International Searching Authority issued by the Finnish Patent and Registration Office acting as the International Searching Authority in relation to International Application No. PCT/FI2020/050140 dated Dec. 2, 2020 (7 pages).
Extended European Search Report dated Oct. 27, 2023, issued in corresponding EP Application No. 20923162, 7 pages.

* cited by examiner

PIPE FLANGE COUPLING DEVICE, A PIPE ASSEMBLY AND A TOP-SUBMERGED-LANCE (TSL) SYSTEM

CROSS-REFERENCE TO RELATED APPLICATIONS

This application is a continuation of PCT International Application No. PCT/FI2020/050140 filed Mar. 4, 2020, the disclosure of this application is expressly incorporated herein by reference in its entirety.

FIELD OF THE DISCLOSURE

The present disclosure relates to flanged pipe couplings, and more particularly to a pipe flange coupling device for coupling two flanged pipes to each other. The present disclosure further concerns a pipe assembly incorporating such a pipe flange coupling device and a top-submerged-lance (TSL) system incorporating such a pipe assembly.

BACKGROUND OF THE DISCLOSURE

Flanges are coupled to each other by attaching the opposing pipe flanges, correspondingly. Typically, this has been done using a threaded connection (i.e. nut and bolt) extending through corresponding holes provided on the opposing flanges. While providing a reliable connection in static installations, threaded connections are time consuming to connect, can be difficult to access and also susceptible to loosening in high vibration environments. Moreover, such threaded connections require personnel to carry out the coupling of the flanged pipes immediately adjacent to the flanges, which may expose the personnel to non-ideal or even unsafe working conditions.

For example, publication EP 1 704 340 B1 discloses a device for automating the coupling of flanged pipes by providing jaws, which clamp the flanges together. However, this device is actuated via a ball screw-type mechanism, which might loosen in high-vibration environments, unless constantly energized or separately secured.

BRIEF DESCRIPTION OF THE DISCLOSURE

An object of the present disclosure is to provide a pipe flange coupling device which provides automated coupling of flanged pipes which are secure even in high-vibration environments. It is a further object of the present disclosure to provide a pipe assembly being secured with such a pipe flange coupling device and a TSL-system having such a pipe assembly.

The object of the disclosure is achieved by a pipe flange coupling device, pipe assembly and a top-submerged-lance (TSL) system.

The disclosure is based on the idea of providing a pipe flange coupling device, which is attachable in connection with a first pipe of a first pipe flange, having pawls engaging a second pipe flange of a second pipe. The pawls are fixed to a spindle retractable by a translation arrangement so as to pull the second pipe flange against the first pipe flange. More particularly, the translation arrangement is configured such that, when the flanged pipes are coupled and the pawls are retracted, a force exerted on the pawls towards their extended position is transmitted via the translation arrangement against a mechanical stopper. Moreover, the translation arrangement is biased such that the translation arrangement must work against this bias in order to extend the pawls and release flanged pipes coupled to each other.

An advantage of the disclosure is that secure automated coupling of flanged pipes is achieved even in high-vibration environments.

BRIEF DESCRIPTION OF THE DRAWINGS

In the following the disclosure will be described in greater detail by means of preferred embodiments with reference to the accompanying drawings, in which.

DETAILED DESCRIPTION OF THE DISCLOSURE

According to a first aspect of the present disclosure, a pipe flange coupling device for coupling a first pipe 1 flange 1a to a second pipe 2 flange 2a is provided.

The pipe flange coupling device 3 comprises a frame 4 attachable in connection with a first pipe 1 of the first pipe flange 1a. For example, the frame 4 may be provided as a boxed structure at least partially housing some of the components of the device, such as the translation arrangement, a rotation arrangement and a part of a spindle.

Preferably, but not necessarily, the frame is equipped with a means for attaching the frame 4 to the first pipe flange 1a. For example the frame 4 may comprise a pair of flank plates which may be welded to the first pipe flange 1a. Alternatively, the frame 4 may comprise threaded holes, which are used to bolt the frame to flank plates already provided on the first pipe flange 1a. It should be understood, that other ways of attaching the frame 4 relative to the first pipe flange 1a, may be provided. For example, the frames could be attached to a complete intermediate mounting flange which can be mounted between the first and second pipe flanges.

The pipe flange coupling device 3 further comprises a spindle 5 having a longitudinal axis running substantially parallel with the first pipe 1 of the first pipe flange 1a on a radial outside of the first pipe flange 1a as seen along the longitudinal direction, when in use. The spindle 5 has a proximal end 5a and a distal end 5b extending longitudinally over the first pipe flange 1a, when in use. The spindle 5 further has a pawl 6 fixed to the distal end 5b of the spindle 5 and radially extending therefrom.

Preferably, but not necessarily, the proximal end 5a may be housed within the frame 4, while the distal end 5b may extend out of the frame 4.

The spindle 5 has been arranged as radially confined with respect to the frame 4 and axially movable along the longitudinal axis with respect to the frame 4 between an extended position and a retracted position. Furthermore, the spindle 5 has been arranged as rotatably movable about the longitudinal axis with respect to the frame 4 between a inwardly rotated position, in which the pawl 6 overlaps with the first pipe flange 1a, as seen along the longitudinal direction when in use, and an outwardly rotated position in which the pawl 6 does not overlap with the first pipe flange 1a as seen along the longitudinal direction when in use.

The pipe flange coupling device 3 further comprises a rotation arrangement 10 coupled to the spindle 5 so as to selectively rotate the spindle 5 between the inwardly rotated position and the outwardly rotated position.

The pipe flange coupling device 3 further comprises a translation arrangement coupled to the spindle 5 so as to selectively move the spindle 5 between an extended position and a retracted position thereof. The translation arrangement has an open position and a mechanically restricted closed position, such that movement from the open position to the closed position causes the spindle to move from the extended position to the retracted position.

Moreover, the translation arrangement is associated with a biasing member for biasing the translation arrangement into its closed position.

The translation arrangement and the associated biasing member are configured such that, during a transition from the open position to the closed position, subsequent to the spindle 5 reaching the retracted position, the translation arrangement first works against the biasing member before reaching the closed position. A rebound of the biasing member then subsequently biases the translation arrangement towards its closed position.

The translation arrangement and the associated biasing member are further configured such that, during a transition from the closed position to the open position, prior to the spindle 5 departing the retracted position, the translation arrangement works against the biasing member so as to reach the open position.

The translation arrangement is further configured such that, in the closed position, a force exerted on the spindle 5 towards the extended position causes the translation arrangement to exert a force against the mechanically limited closed position, thereby preventing the spindle 5 from moving towards the extended position.

In an embodiment according to the first aspect of the present disclosure, the translation arrangement comprises a first stopper 12 fixed to the spindle 5 between the proximal end 5a and the distal end 5b, and extending radially from the spindle 5 with respect to adjacent portions thereof.

Preferably, but not necessarily, the stopper 12 may be provided as a thrust nut threadedly attached to the spindle 5.

The translation arrangement further comprises a first thrust plate 7 engaged with the first stopper 12 in a first direction corresponding to the movement of the spindle 5 towards its retracted position. That is, the first thrust plate 7 is radially confined with respect to the spindle 5, while relative movement between the thrust plate 7 and spindle 5 is allowed rotationally about and axially along the longitudinal axis of the spindle 5.

Preferably, but not necessarily, the cam 8 is provided with a bearing surface, for example a roller, engaging the thrust plate 7.

Preferably, but not necessarily, the translation arrangement further comprises a thrust bearing provided between the thrust plate 7 and the stopper 12, most suitably between the thrust plate 7 and the compressible element 13.

The translation arrangement further comprises a first compressible element 13 as the biasing member, arranged between the first thrust plate 7 and the first stopper 12, such that the first thrust plate 7 is engaged with the first stopper 12 via the first compressible element 13, and such that the first compressible element 13 is compressible in the first direction, thereby allowing a corresponding relative movement between the first thrust plate 7 and the first stopper 12 in the first direction.

The translation arrangement further comprises a cam 8 engaged with the first thrust plate 7 at least in the first direction. The cam 8 is pivotable between an open position and a mechanically limited closed position.

The translation arrangement further comprises a first actuator 9 coupled to the cam 8 and configured to selectively operate the cam between the open position and the closed position, and vice versa.

The translation arrangement further comprises a return arrangement 11 configured to push the spindle 5 from the retracted position to the extended position, when the cam 8 is moved from the closed position to the open position.

For example, the return arrangement could be implemented by providing a return spring 11 biasing the spindle 5 towards the extended position thereof. If such a spring is provided, it should have a lower spring rate than the compressible element 13, i.e., the compressible element 13 should yield less than the spring 11 of the return arrangement under the same load. Most suitably, such a return spring 11 is provided between the stopper 12 and a backing plate fixed with respect to the frame. Alternatively, the return arrangement could be implemented by providing a second thrust plate (not illustrated) engaging with a second stopper (not illustrated) in the second direction opposite to the first direction.

Moreover, the cam 8, the thrust plate 7, the compressible element 13 and the return arrangement 11 are configured such that a movement of the cam 8 from the open position to the closed position firstly pushes the spindle 5, via the first thrust plate 7, the first compressible element 13 and the first stopper 12, from its extended position to its retracted position, correspondingly. During this time, the engaging point of the cam 8 (i.e. the point of the cam engaging with the first thrust plate 7) moves towards the first direction.

This is followed, after the spindle 5 having reached its retracted position, by the thrust plate 7 being pushed towards the stopper 12 allowed by the compression of the compressible element 13 in the first direction. During this time, the engaging point of the cam 8 still moves in the first direction.

This is further followed by a rebound of the compressible element 13 pushing the cam 8, in a second direction opposite to the first direction, to its closed position via the thrust plate 7, thereby biasing the cam 8 against its closed position. During this time, the engaging point of the cam 8 moves in the second direction. That is, the closed position of the cam 8 is an over-the-center-position, in which it is biased by the compressible element 13.

The cam 8, the thrust plate 7, the compressible element 13 and the return arrangement 11 are further configured such that a movement of the cam 8 from the closed position to the open position firstly pushes thrust plate 7 towards the stopper 12 allowed by the compression of the compressible element 13 in the first direction. During this time, the engaging point of the cam 8 again moves in the first direction.

This is followed by the rebound of the compressible element 13 pushing the cam 8, and its engaging point, in the second direction, via the thrust plate 7, thereby releasing biasing of the cam against its closed position 8. That is, the cam 8 is released from its biased over-the-center position.

This is further followed by the return arrangement 11 pushing the spindle 5 from the retracted position to the extended position. During this time the engaging point of the cam 8 moves in the second direction.

In an embodiment according to the first aspect of the present disclosure, the first actuator 9 is a linear actuator configured to pivot the cam 8 between the open and closed positions thereof.

Any suitable linear actuator may be used. For example, the linear actuator 9 could a pneumatic actuator, a hydraulic actuator, or an electromechanical actuator, such as a ball-screw-type actuator.

In an embodiment according to the first aspect of the present disclosure, the rotation arrangement 10 is configured to rotate the spindle 5 from the outwardly rotated position to the inwardly rotated position during a movement of the spindle 5 from the extended position to the retracted position, prior to the spindle 5 reaching the retracted position.

The rotation arrangement 10 is further configured to rotate the spindle 5 from the inwardly rotated position to the outwardly rotated position during a movement of the spindle 5 from the retracted position to the extended position, subsequent to the spindle 5 departing the retracted position.

Such an arrangement ensures, that the pawls are not rotated while in frictional contact with the second pipe 2 flange 2a, thereby minimizing the torque required for rotation.

Preferably, but not necessarily, the rotation arrangement 10 comprises a second actuator. For example, the second actuator could be a hydraulic actuator, a pneumatic actuator, or an electro-mechanic actuator.

As an example, the second actuator could be a rotary actuator fixed with respect to the frame 4, and coupled to the spindle 5 so that it is rotationally engaged, while allowing a relative movement in the longitudinal direction.

This could be carried out, for example, by providing a splined connection between the second actuator and the spindle 5.

Alternatively, this could be carried out providing a sleeve 14a rotationally coupled with the second actuator. The proximal end 5a of the spindle 5 could then be received within the sleeve 14a such that longitudinal movement therebetween is allowed. The proximal end 5a of the spindle 5 could be provided with a guide 14b extending radially from the spindle and rotationally engaging with a longitudinal groove provided on the sleeve 14a. The longitudinal groove on the sleeve 14a then allows the longitudinal movement of the guide 14b and the spindle 5 with respect to the sleeve 14a, while rotationally coupling the second actuator with the spindle 5.

Such an arrangement having a sleeve 14a and a guide 14b may further be complemented with an additional bushing surrounding the sleeve 14a and being fixed with respect to the frame 4. This bushing is provided with an additional groove engaged with the guide 14b extending through the sleeve 14a. Furthermore, the additional groove suitably has a shape corresponding to the travel path of the spindle. For example, the additional groove may have a longitudinal groove portion corresponding to the travel of the spindle 5 from the retracted position to the extended position (and vice versa) and a circumferential groove portion (i.e. a groove portion transverse to the longitudinal groove portion) corresponding to the rotation of the spindle between the inwardly and outwardly rotated positions of the spindle 5. Particularly, arranging the circumferential groove to extend from the point of the longitudinal groove portion corresponding to the extended position of the spindle, rotational locking of the spindle 5 at the retracted position is achieved, as no rotational movement is allowed thereat by the additional groove of the bushing.

Alternatively, the rotation arrangement 10 may be implemented without a second actuator and without a sleeve, by providing a similar bushing and guide as describe above, but with the form of the additional groove being configured so as to translate the longitudinal movement of the spindle into the desired rotational movement, i.e. having the pawls inwardly rotated in the retracted position of the spindle 5 and outwardly rotated in the extended position of the spindle. In such a case, a partially helical groove shape may be used, for example. Furthermore, the rotation of the spindle may be facilitated by providing e.g. torsional springs for rotationally biasing the spindle 5.

In an embodiment according to the first aspect of the present disclosure, the biasing member, preferably the compressible element 13 is provided as a disc spring. Alternatively, or additionally, other compressible elements, such as annular elastomeric elements may be used.

It should be noted that the first aspect of the present disclosure encompasses any combination of two or more embodiments, or variants thereof, as discussed above.

According to a second aspect of the present disclosure, a pipe assembly is provided.

The pipe assembly comprises a first pipe 1 equipped with a first pipe flange 1a and a second pipe 2 equipped with a second pipe flange 2a.

The pipe assembly further comprises the pipe flange coupling device 3 according to the first aspect, as discussed above, wherein the frame 4 of the pipe flange coupling device 3 is attached in connection with the first pipe 1.

Moreover, the pipe flange coupling device 3 is attached in connection with the first pipe 1 such that the longitudinal axis of the spindle 5 runs substantially parallel with that of the first pipe 1 on a radial outside of the first pipe flange 1a, as seen along the longitudinal direction. The distal end 5b of the spindle 5 extends over the first pipe flange 1a and the second pipe flange 2a. Moreover, the pawl 6 overlaps with the first pipe flange 1a and the second pipe flange 2a in the inwardly rotated position thereof, and the pawl 6 does not overlap with the first pipe flange 1a and the second pipe flange in the outwardly rotated position thereof, as seen along the longitudinal direction.

The first pipe 1 is coupled to the second pipe 2 by the first pipe flange 1a abutting the second pipe flange 2a, and by the pawl 6 of the pipe coupling device 3 engaging the second pipe flange 2a and pressing the second pipe flange 2a against the first pipe flange 1a.

Preferably, but not necessarily, the frame 4 of pipe flange coupling device 3 is attached to the first pipe flange 1a. This could be achieved, for example, by attaching a pair of flank plates to the pipe coupling device 3, and then fixing the flank plates to the first pipe flange 1a. Fixing of the flank plates could be achieved by welding, threaded connection, or any other suitable means of fixing.

Figure 4:
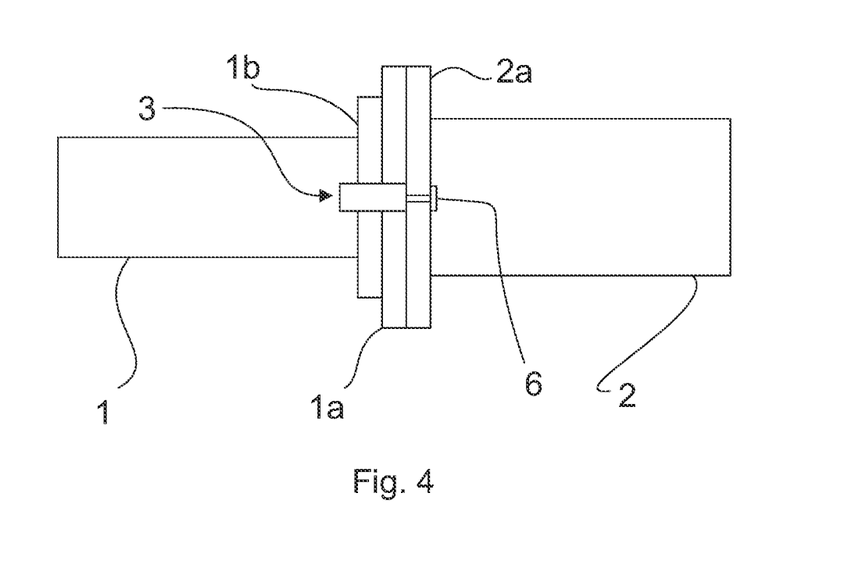
FIG. 4 illustrates a partial schematic view of a pipe assembly according to an alternative embodiment.
Figure 5:
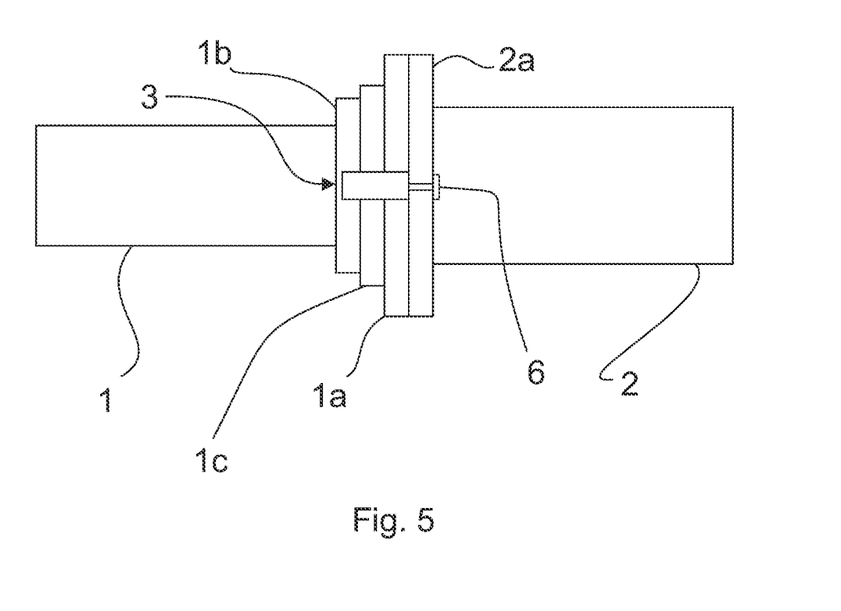
FIG. 5 illustrates a partial schematic view of a pipe assembly according to another alternative embodiment.

It should be noted, that the first pipe flange 1a does not necessarily need to be rigidly, or directly fixed to the first pipe 1. For example, the first pipe flange 1a could be provided as a separate mounting flange, which is attached to an integral flange 1b of the first pipe 1 as shown in FIG. 4, or even to an intermediate pipe flange 1c attached to an integral flange of the first pipe 1 as shown in FIG. 5. This enables the more flexible installation of the pipe flange coupling device 3 in connection with pre-existing pipes and pipe flanges, i.e., retro fitting. For example, the first pipe 1 may have an integral pipe flange, onto which a flexible bellows is attached, having intermediate flanges on both ends thereof. The mounting flange 1a would then be attached to the intermediate flange of the bellows on a side of the bellows opposite to the first pipe 1.

Preferably, but not necessarily, the pipe assembly may comprise multiple pipe flange coupling devices 3, most suitably disposed circumferentially about the first pipe 1.

It should be noted that the second aspect of the present disclosure encompasses any combination of two or more embodiments, or variants thereof, as discussed above.

Figure 6:
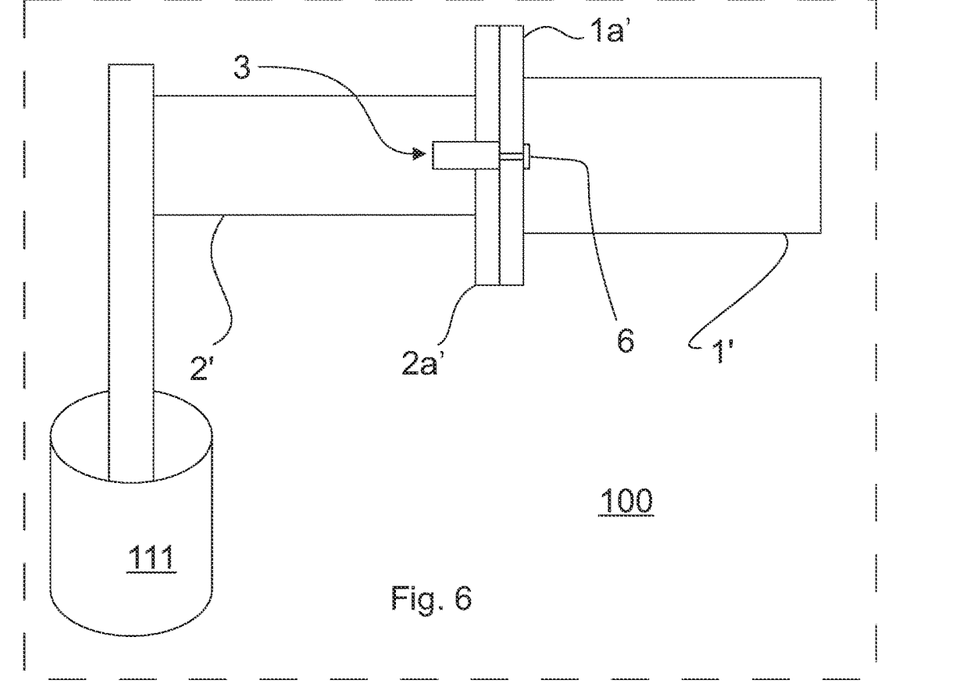
FIG. 6 illustrates a schematic view of a top-submerged-lance (TSL) system according to an embodiment.
Figure 7:
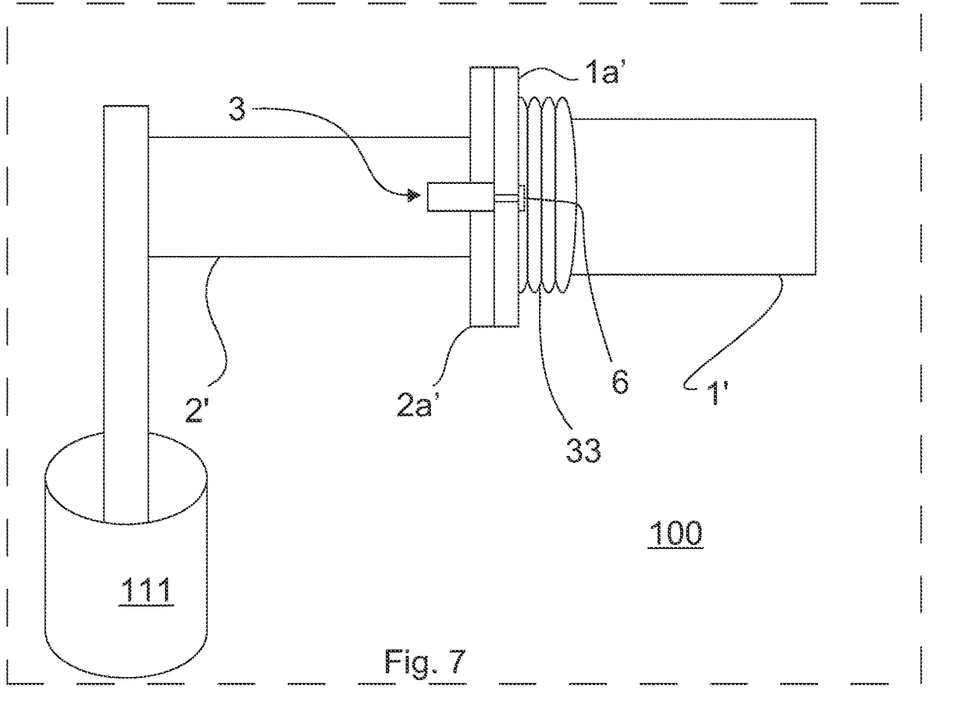
FIG. 7 illustrates a schematic view of a top-submerged-lance (TSL) system according to an alternative embodiment.

According to a third aspect of the present disclosure, a top-submerged-lance (TSL) system 100 is provided as shown in FIGS. 6 and 7. The TSL-system comprises a furnace 111, a feed pipe 1' for providing a feed flow, the feed pipe having a feed flange 1a'. The TSL-system further comprises a top-submerged lance for introducing the feed flow into the furnace. The lance further comprises a lance pipe 2' having a lance flange 2a' for coupling the lance pipe 2' with the feed pipe 1'.

Particularly, the TSL-system further comprises the pipe assembly according to the second aspect of the present disclosure, wherein the first pipe 1 of the pipe assembly is the feed pipe and the second pipe 2 of the pipe assembly is the lance pipe.

Preferably, but not necessarily, the feed flange 1a' is attached to the feed pipe 1' with a flexible bellows 33 as shown in FIG. 7. This helps disconnecting vibrations of the lance from the coupling of the feed pipe flange 1a' and the lance pipe 2'.

It should be noted that the third aspect of present disclosure encompasses any combination of two or more embodiments, or variants thereof, as discussed above.

Figure 1:
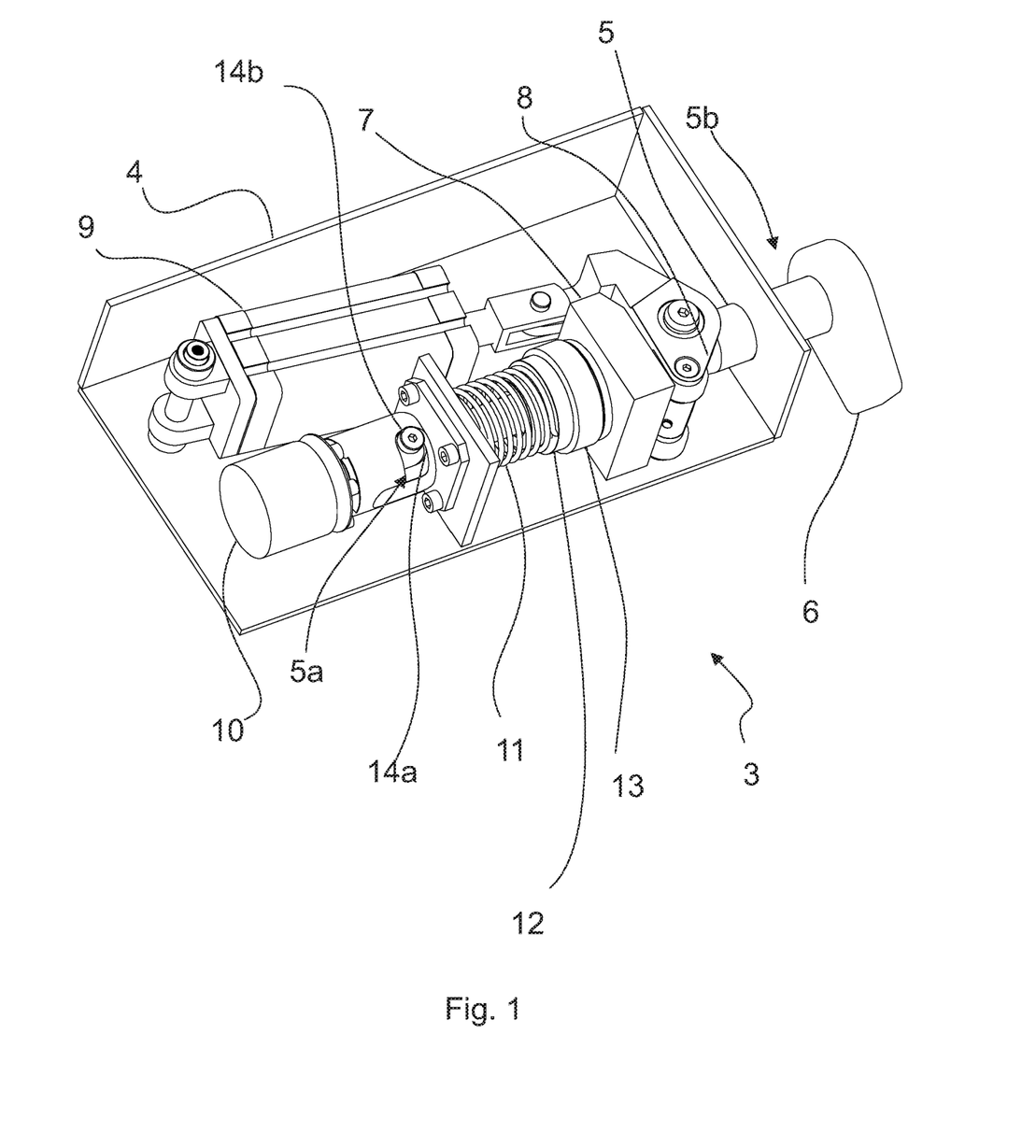
FIG. 1 illustrates a perspective view of a pipe flange coupling device according to an embodiment of the present disclosure.

FIG. 1 illustrates a perspective view of a pipe flange coupling device 3 according to an embodiment of the present disclosure. The pipe flange coupling device 3 comprise a box-like frame 4, parts of which have been omitted from FIG. 1 for the purpose better illustrating other components of the device. The device 3 has a spindle 5 with a distal end 5b residing outside of the frame 4 and a proximal end 5a residing within the frame 4. The distal end 5b is equipped with a pawl 6 extending radially from the spindle 5.

The device 3 has a cam 8, which can be pivoted by actuation of the first actuator 9, provided as a linear actuator. The pivot point of the cam 8 is fixed with respect to the frame 4. The cam 8 engages with the first thrust plate 7 in a first direction (i.e. towards the proximal end 5b of the spindle).

The first thrust plate 7 is radially confined with respect to the spindle 5, while longitudinal movement therebetween is allowed. The thrust plate 7 engages with the spindle in the first direction via the compressible element 13, provided as disc springs, and the thrust nut 12, which has been threadedly fixed to the spindle 5.

A return spring 11 is provided for biasing the spindle 5, via the thrust nut 12, towards the second direction, opposite to the first direction. That is, the return spring is on the spindle 5, between the thrust nut 12 and a backing plate fixed with respect to the frame.

A rotation arrangement comprising a second actuator 10 has been provided in connection with proximal end 5a of the spindle 5 such that that longitudinal movement between the spindle 5 and the actuator 10 is allowed.

Figure 2:
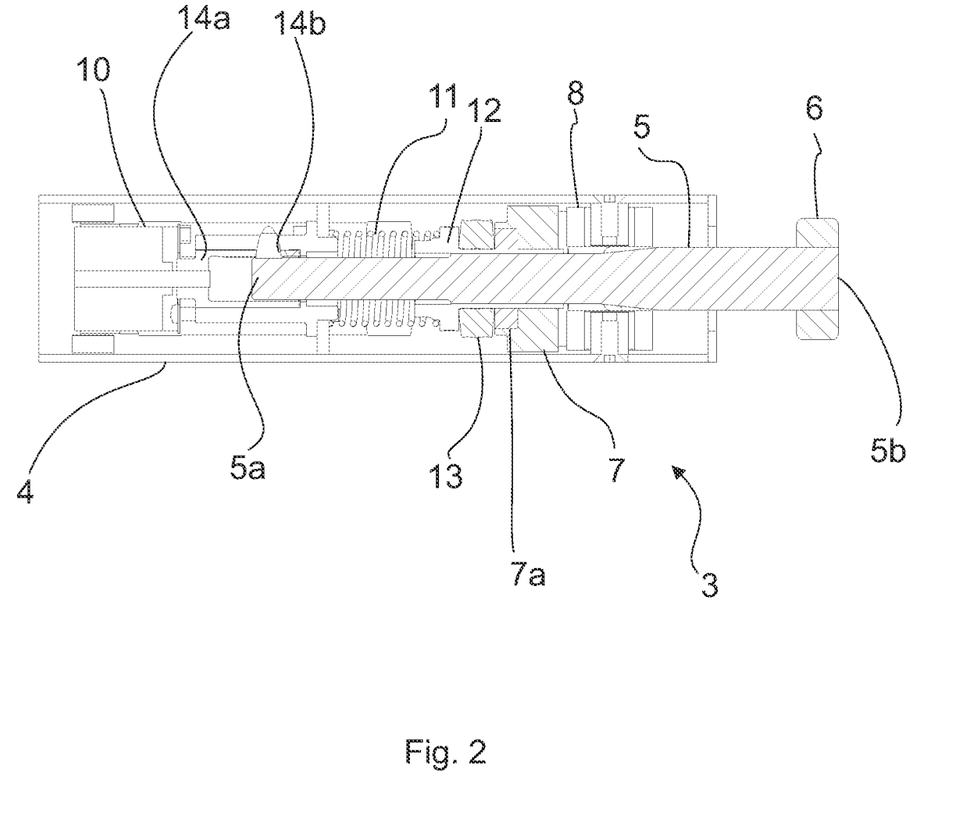
FIG. 2 illustrates a partial cut view of the pipe flange coupling device of FIG. 1.

FIG. 2 illustrates a partial cut view of the pipe flange coupling device of FIG. 1. Particularly, FIG. 2 better illustrates how the cam 8 is engaged with the spindle 5 in the first direction via the thrust plate 7, thrust bearing 7a, disc spring 13 and thrust nut 12. That is, the cam 8, the thrust plate 7, thrust bearing 7a and disc spring 13 are not directly coupled to the spindle 5, whereas the thrust nut 12 is coupled to the spindle by means of a threaded connection. Naturally other coupling method may be used for coupling the thrust nut 12 to the spindle 5. In a similar manner, the spring of the return arrangement 11 is coupled to the spindle via the thrust nut 12. More particularly, the spring of the return arrangement 11 is provided between a backing plate fixed to the frame 4 and the thrust nut 12 so as to bias the spindle towards the second direction. Moreover, the shaft of the second actuator 10 is rotationally coupled to the sleeve 14a having a longitudinal groove in which the guide 14b of the spindle 5 is allowed to travel in a longitudinal direction. The sleeve 14a is housed by a bushing fixed with respect to the frame 4. The bushing is equipped with an additional groove, as discussed above, into which the guide 14b extends through the groove in sleeve 14a.

Figure 3:
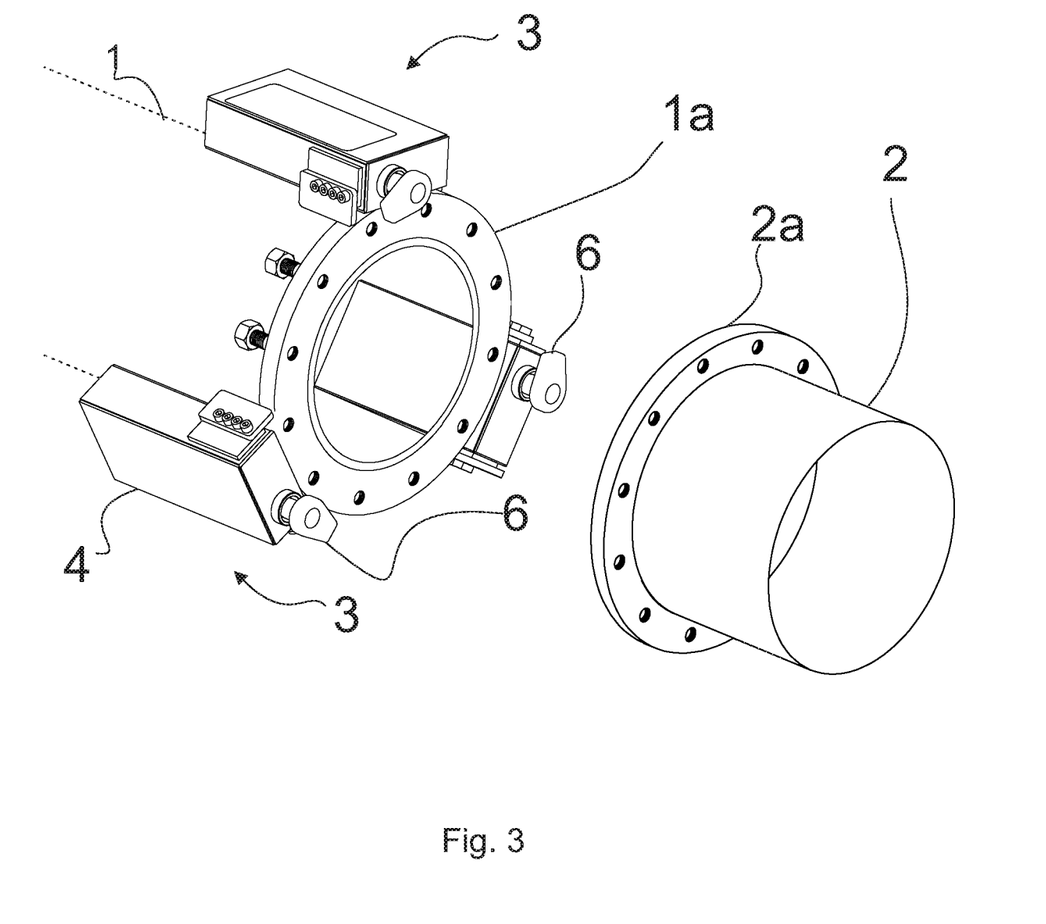
FIG. 3 illustrates a perspective view of a pipe assembly according to an embodiment of the present.

FIG. 3 illustrates a perspective view of a pipe assembly according to an embodiment of the present disclosure as an exploded view (i.e. the first pipe and the second pipe being detached from each other). The first pipe 1 (illustrated with dotted lines for the purpose of clarity) of the pipe assembly is provided with the first pipe flange 1a and the second pipe 2 of the pipe assembly is provided with the second pipe flange 2a. As already discussed above, the first pipe flange 1a may be provided in connection with the first pipe 1 and an integral pipe flange, or an intermediate pipe flange attached to the integral pipe flange of the first pipe 1. Particularly, the pipe assembly of FIG. 3 is equipped with three pipe flange coupling devices 3 according to those of FIGS. 1 and 2, each one being attached to the first flange 1a with a pair of flank plates. Naturally, any number of coupling devices 3 could be used, depending on the pipe size and application. and FIG. 3 illustrates the pipe flange coupling devices 3 having their respective spindles 5 in an extended and outwardly rotated position. The pipes are coupled by bringing the first pipe flange 1a and the second pipe flange 2a against each other, such that their annular face surfaces oppose one another. The spindles 5 of the pipe flange coupling devices 3 are then rotated into their inwardly rotated positions, such that the pawls 6 overlap with the flange 2a as seen along the longitudinal direction of the pipe 2, and reach over and behind the flange 2a. The spindles 5 are then subsequently pulled into their retracted positions, as described above, thereby pressing the first pipe flange 1a and the second pipe flange 2a together and achieving coupling of the first and second pipes 1, 2.

The invention claimed is:

1. A pipe flange coupling device for coupling a first pipe flange to a second pipe flange, comprising:
  a frame attachable in connection with a first pipe of the first pipe flange;
  a spindle, having:
    a longitudinal axis running substantially parallel with the first pipe of the first pipe flange on a radial outside of the first pipe flange as seen along the longitudinal direction, when in use;
    a proximal end;
    a distal end extending longitudinally over the first pipe flange, when in use,
    a pawl fixed to the distal end of the spindle and radially extending therefrom, wherein the spindle being arranged as:
radially confined with respect to the frame;
axially movable along the longitudinal axis with respect to the frame between an extended position and a retracted position, and
rotatably movable about the longitudinal axis with respect to the frame between a inwardly rotated position, in which the pawl overlaps with the first pipe flange, as seen along the longitudinal direction when in use, and an outwardly rotated position in which the pawl does not overlap with the first pipe flange as seen along the longitudinal direction when in use,
a rotation arrangement coupled to the spindle so as to selectively rotate the spindle between the inwardly rotated position and the outwardly rotated position;
a translation arrangement coupled to the spindle so as to selectively move the spindle between an extended position and a retracted position thereof, wherein the translation arrangement has an open position and a mechanically restricted closed position, such that movement from the open position to the closed position causes the spindle to move from the extended position to the retracted position, and
the translation arrangement is associated with a biasing member for biasing the translation arrangement into the closed position, wherein the translation arrangement and the associated biasing member being configured such that
during a transition from the open position to the closed position, subsequent to the spindle reaching the retracted position, the translation arrangement first works against the biasing member before reaching the closed position, whereby rebound of the biasing member subsequently biases the translation arrangement towards the closed position, and
during a transition from the closed position to the open position, prior to the spindle departing the retracted position, the translation arrangement works against the biasing member so as to reach the open position;
wherein, the translation arrangement being further configured such that, in the closed position, a force exerted on the spindle towards the extended position causes the translation arrangement to exert a force against the mechanically restricted closed position, thereby preventing the spindle from moving towards the extended position.

2. The pipe flange coupling device according to claim 1, wherein the translation arrangement comprising:
a first stopper fixed to the spindle between the proximal end and the distal end, and extending radially from the spindle with respect to adjacent portions thereof,
a first thrust plate engaged with the first stopper in a first direction corresponding to the movement of the spindle towards the retracted position, wherein the first thrust plate is radially confined with respect to the spindle, while relative movement between the first thrust plate and spindle being allowed rotationally about and axially along the longitudinal axis of the spindle;
a first compressible element as the biasing member, arranged between the first thrust plate and the first stopper such that the first thrust plate is engaged with the first stopper via the first compressible element, and such that the first compressible element is compressible in the first direction thereby allowing a corresponding relative movement between the first thrust plate and the first stopper in the first direction;
a cam engaged with the first thrust plate at least in the first direction, the cam being pivotable between an open position and a mechanically limited closed position;
a first actuator coupled to the cam and configured to selectively operate the cam between the open position and the closed position, and vice versa, and
a return arrangement configured to push the spindle from the retracted position to the extended position, when the cam is moved from the closed position to the open position,
wherein the cam, the first thrust plate, the first compressible element and the return arrangement are configured such that:
a movement of the cam from the open position to the closed position:
firstly, pushes the spindle, via the first thrust plate, the first compressible element and the first stopper, from the extended position to the retracted position, correspondingly,
followed by the first thrust plate being pushed towards the first stopper allowed by the compression of the first compressible element in the first direction, and
further followed by a rebound of the first compressible element pushing the cam, in a second direction opposite to the first direction, to the closed position via the first thrust plate, thereby biasing the cam against the closed position, and
a movement of the cam from the closed position to the open position:
firstly, pushes the first thrust plate towards the first stopper allowed by the compression of the first compressible element in the first direction,
followed by the rebound of the first compressible element pushing the cam, via the first thrust plate, in the second direction, thereby releasing biasing of the cam against the closed position, and
further followed by the return arrangement pushing the spindle from the retracted position to the extended position.

3. The pipe flange coupling device according to claim 2, wherein the first actuator is a linear actuator configured to pivot the cam between the open and closed positions thereof.

4. The pipe flange coupling device according to claim 2, wherein the rotation arrangement comprises a second actuator.

5. The pipe flange coupling device according to claim 4, wherein the second actuator is a rotary actuator coupled to the spindle engaged in a rotational direction, while allowing a relative movement in the longitudinal direction.

6. The pipe flange coupling device according to claim 2, wherein the return arrangement comprises a return spring biasing the spindle towards the extended position thereof.

7. The pipe flange coupling device according to claim 2, wherein a thrust bearing is provided between the first thrust plate and the first stopper.

8. The pipe flange coupling device according to claim 7, wherein the thrust bearing is provided between the first thrust plate and the first compressible element.

9. The pipe flange coupling device according to claim 2, wherein the cam is provided with a roller engaging the first thrust plate.

10. The pipe flange coupling device according to claim 2, wherein the first stopper is provided as a thrust nut threadedly attached to the spindle.

11. The pipe flange coupling device according to claim 1, wherein the rotation arrangement is configured to:

rotate the spindle from the outwardly rotated position to the inwardly rotated position during a movement of the spindle from the extended position to the retracted position, prior to the spindle reaching the retracted position, and rotate the spindle from the inwardly rotated position to the outwardly rotated position during a movement of the spindle from the retracted position to the extended position, subsequent to the spindle departing the retracted position.

12. The pipe flange coupling device according to claim 1, wherein the biasing member is provided as a disc spring.

13. The pipe flange coupling device according to claim 1, wherein the frame is equipped with attachment means for attaching the frame to the first pipe flange.

14. A pipe assembly, comprising:
a first pipe equipped with a first pipe flange,
a second pipe equipped with a second pipe flange,
further comprising the pipe flange coupling device according to claim 1, wherein the frame of the pipe flange coupling device is attached in connection with the first pipe such that:
the longitudinal axis of the spindle runs substantially parallel with that of the first pipe on a radial outside of the first pipe flange as seen along the longitudinal direction;
the distal end of the spindle extends over the first pipe flange and the second pipe flange, and
the pawl overlaps with the first pipe flange and the second pipe flange in the inwardly rotated position thereof and the pawl does not overlap with the first pipe flange and the second pipe flange in the outwardly rotated position thereof, as seen along the longitudinal direction, and wherein the first pipe is coupled to the second pipe by the first pipe flange abutting the second pipe flange, and by the pawl of the pipe coupling device engaging the second pipe flange and pressing the second pipe flange against the first pipe flange.

15. The pipe assembly according to claim 14, wherein the frame of the pipe flange coupling device is attached to the first pipe flange.

16. The pipe assembly according to claim 14, wherein the first pipe flange is provided as a separate mounting flange attached to an integral flange of the first pipe, or as a separate mounting flange attached to an intermediate pipe flange which, in turn, is attached to an integral flange of the first pipe.

17. The pipe assembly according to claim 14, comprising multiple pipe flange coupling devices disposed circumferentially about the first pipe.

18. A top-submerged-lance (TSL) system, comprising:
a furnace;
a feed pipe for providing a feed flow, the feed pipe having a feed flange; and
a top-submerged lance for introducing the feed flow into the furnace, the lance comprising a lance pipe having a lance flange for coupling the lance pipe with the feed pipe;
the top-submerged-lance system further comprising the pipe assembly according to claim 14,
wherein the first pipe of the pipe assembly is the feed pipe and the second pipe of the pipe assembly is the lance pipe.

19. The top-submerged-lance system according to claim 18, wherein the feed flange is attached to the feed pipe with a flexible bellows.

* * * * *